(12) United States Patent
Durth et al.

(10) Patent No.: US 9,906,016 B2
(45) Date of Patent: Feb. 27, 2018

(54) IGNITION CIRCUIT

(71) Applicant: PHOENIX CONTACT GMBH & CO. KG, Blomberg (DE)

(72) Inventors: Rainer Durth, Horn-Bad Meinberg (DE); Mario Stolzenberg, Detmold (DE)

(73) Assignee: Phoenix Contact GMBH & Co. KG (DE)

( * ) Notice: Subject to any disclaimer, the term of this patent is extended or adjusted under 35 U.S.C. 154(b) by 330 days.

(21) Appl. No.: 14/440,555

(22) PCT Filed: Nov. 8, 2013

(86) PCT No.: PCT/EP2013/003364
§ 371 (c)(1),
(2) Date: May 4, 2015

(87) PCT Pub. No.: WO2014/075782
PCT Pub. Date: May 22, 2014

(65) Prior Publication Data
US 2015/0288176 A1    Oct. 8, 2015

(30) Foreign Application Priority Data

Nov. 16, 2012   (DE) .................. 10 2012 022 399

(51) Int. Cl.
*H02H 9/06* (2006.01)
*H01C 7/10* (2006.01)
(Continued)

(52) U.S. Cl.
CPC ............... *H02H 9/06* (2013.01); *H01C 7/10* (2013.01); *H01C 7/12* (2013.01); *H01T 1/16* (2013.01); *H01T 2/02* (2013.01); *H01T 4/16* (2013.01)

(58) Field of Classification Search
CPC .... H02H 9/06; H01T 1/20; H01T 2/02; H01T 4/16; H01T 4/20
See application file for complete search history.

(56) References Cited

U.S. PATENT DOCUMENTS 3,544,847 A * 12/1970 Sakshaug ............... H01T 4/16
361/128
4,198,668 A * 4/1980 Bergdahl ............. H01H 33/596
361/13
(Continued)

FOREIGN PATENT DOCUMENTS

DE         102 45 144 B3    1/2004
DE    10 2008 026555 A1   12/2009
(Continued)

OTHER PUBLICATIONS

International Search Report prepared by the European Patent Office dated Mar. 12, 2014, for International Application No. PCT/EP2013/003364.

*Primary Examiner* — Scott Bauer
(74) *Attorney, Agent, or Firm* — Sheridan Ross P.C.

(57) ABSTRACT

The object of the invention is an ignition circuit for a series connection of at least two spark gaps for limiting overvoltages with medium and high power, particularly overvoltages corresponding to pulse shapes 8/20 µs and 10/350 µs with amplitudes of about 10 kA to about 200 kA (class I arrester). The spark gaps are each equipped with at least one auxiliary electrode. The ignition circuit has a first varistor and a second varistor, with the ignition circuit being particularly suited to limiting overvoltages with medium power, particularly overvoltages corresponding to pulse shape 8/20 µs with amplitudes of about 10 to about 100 kA (class II arrester). The ignition circuit is designed to be connected to the auxiliary electrodes, with the ignition circuit Z having two ignition subcircuits. The first ignition subcircuit $TZ_1$ has the (Continued)

first varistor $VAR_1$ and is designed to ignite the first spark gap. The second ignition subcircuit has the second varistor and is designed to ignite the second spark gap. Further objects of the invention are an overvoltage protection device with this kind of ignition circuit, as well as the use of a multi-contact varistor for triggering a spark gap.

10 Claims, 5 Drawing Sheets

(51) Int. Cl.
    *H01T 1/16*    (2006.01)
    *H01T 2/02*    (2006.01)
    *H01T 4/16*    (2006.01)
    *H01C 7/12*    (2006.01)

(56) References Cited

U.S. PATENT DOCUMENTS

| | | |
|---|---|---|
| 4,860,156 A | 8/1989 | Stenstroem |
| 2009/0213504 A1* | 8/2009 | Hallstrom ............... H01T 15/00 361/16 |
| 2012/0112872 A1* | 5/2012 | Kang ...................... H01C 7/10 338/21 |

FOREIGN PATENT DOCUMENTS

| | | |
|---|---|---|
| EP | 1 542 323 A2 | 6/2005 |
| WO | WO 2009/050152 A1 | 4/2009 |

* cited by examiner

IGNITION CIRCUIT

CROSS REFERENCE TO RELATED APPLICATIONS

This application is a national stage application under 35 U.S.C. 371 and claims the benefit of PCT Application No. PCT/EP2013/003364 having an international filing date of Nov. 8, 2013, which designated the United States, which PCT application claimed the benefit of German Application No. 10 2012 022 399.4 filed Nov. 16, 2012, the disclosures of each of which are incorporated herein by reference.

The invention relates to an ignition circuit.

Spark gaps are known from the prior art. They are used, among other things, for protecting electrical systems [by being] connected in parallel to such electrical systems. If an overvoltage event occurs, the spark gap is intended to ignite and divert the overvoltage past the electrical system. The aim here is to keep the voltage level at which the spark gap ignites as low as possible. This voltage level is also referred to as the protection level.

In order to keep the protection level low, spark gaps are equipped with an ignition circuit.

Ignition circuits typically provide a pre-ionization of the spark gap, so that the spark gap ignites at substantially lower voltages in comparison to a spark gap without pre-ionization. That is, the voltage level that is required to ignite the spark gap is reduced. The pre-ionization is achieved by an auxiliary electrode that is arranged either centrally or closer to one of the main electrodes of the spark gap. Together with at least one of the main electrodes of the spark gap, the auxiliary electrode constitutes an auxiliary spark gap, while the spark gap between the main electrodes of the spark gap is often referred to as the main spark gap.

However, depending on the structure of the spark gap, it can take some time, e.g., several micro-seconds, before the main spark gap ignites. Since typical overvoltage pulses are associated with very high rates of current rise (kA/μs), it is especially critical to maintain the required protection level during the rise in current. For this reason, another protective path can be provided parallel to the spark gap that keeps the protection level commensurately low for short periods of time. Since this additional protective path is only needed for a short time, it can be designed for lower requirements. For example, the spark gap can be an arrester corresponding to class I, while arresters corresponding to class II are used in the other protective path.

Although the abovementioned arrangements already lead to a reduction of protection levels, they are still relatively high. Moreover, the design of the other protective paths is often disadvantageous because this often leads to the introduction of a parasitic inductive component that is not to be underestimated.

It is the object of the invention to provide an ignition circuit which avoids the drawbacks of the prior art in an inventive manner.

According to the invention, the object is achieved by the features of the independent claims. Advantageous embodiments of the invention are indicated in the subclaims.

Below, the invention is described in further detail with reference to the enclosed drawing on the basis of preferred embodiments.

Figure 1:
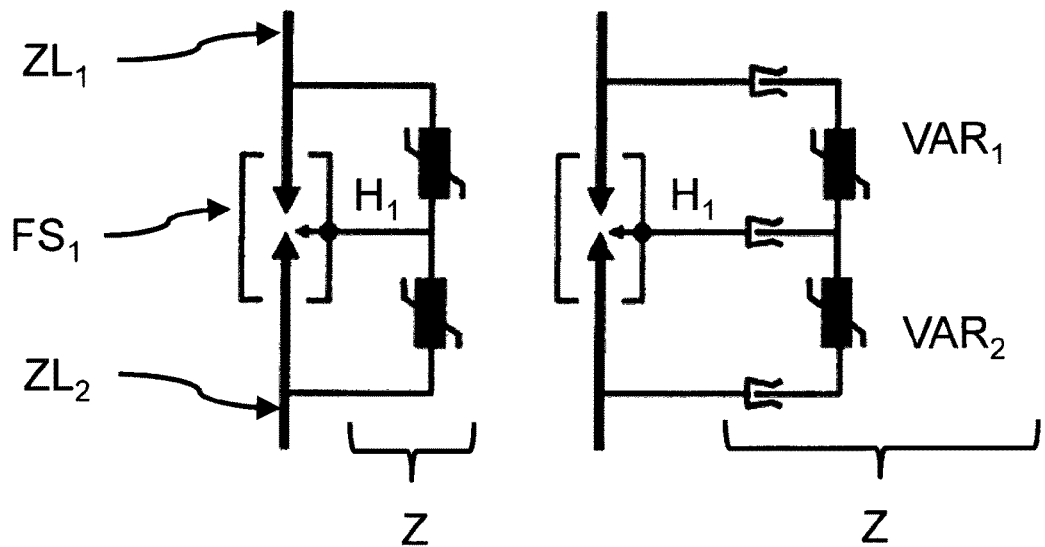
FIG. 1 shows schematic arrangements of spark gaps with an ignition circuit.

FIG. 1 shows schematic arrangements of spark gaps $FS_1$ with an ignition circuit Z. The spark gap has a first lead $ZL_1$ and a second lead $ZL_2$. The ignition circuit Z is embodied as a second protective path as a series connection of two varistors $VAR_1$, $VAR_2$. The series connection is operated as a kind of voltage divider, with the tap of the voltage divider being led to the auxiliary electrode $H_1$ of a spark gap. That is, in case of an overvoltage event, the varistors $VAR_1$, $VAR_2$ first become conductive and, as a result, [this leads to] a prompt ignition of the spark gaps $FS_1$ via the auxiliary electrode $H_1$. In other words, the time until the ignition of the spark gap is bridged by the second protective path. An overloading of the second protective path can be prevented through appropriate dimensioning of the voltage divider and auxiliary electrode by causing the spark gap to ignite early as a result of an existing pre-ionization. The simultaneous design of the ignition circuit Z as a parallel discharge path leads to an advantageous reduction in required components.

As shown on the left side in FIG. 1, the arrangement can be structurally unified or, as shown on the right side, the ignition circuit Z can be embodied so as to be connectable, e.g., pluggable.

Figure 2:
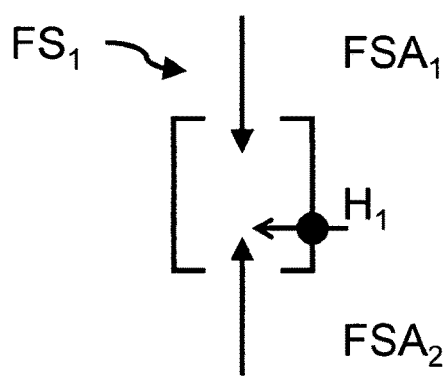
FIG. 2 shows a detail of a spark gap with auxiliary electrode.

FIG. 2 shows detail of a spark gap $FS_1$ with auxiliary electrode $H_1$. This spark gap $FS_1$ has a first spark gap connector $FSA_1$ and a second spark gap connector $FSA_1$ [sic]. The first spark gap connector $FSA_2$ [sic] is connected to a first (main) electrode of the spark gap and the second spark gap connector $FSA_2$ is connected to a second (main) electrode of the spark gap. Moreover, the spark gap $FS_1$ has an auxiliary electrode $H_1$. The auxiliary electrode $H_1$ can be arranged either centrally or closer to one of the two main electrodes, or it can be resistively connected to one of the main electrodes.

Figure 3:
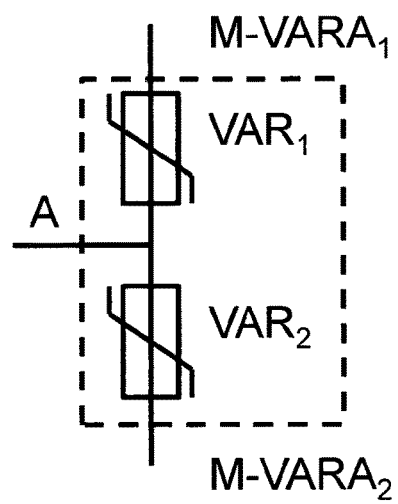
FIG. 3 shows a schematic layout of a multi-contact varistor with a tap.
Figure 4:
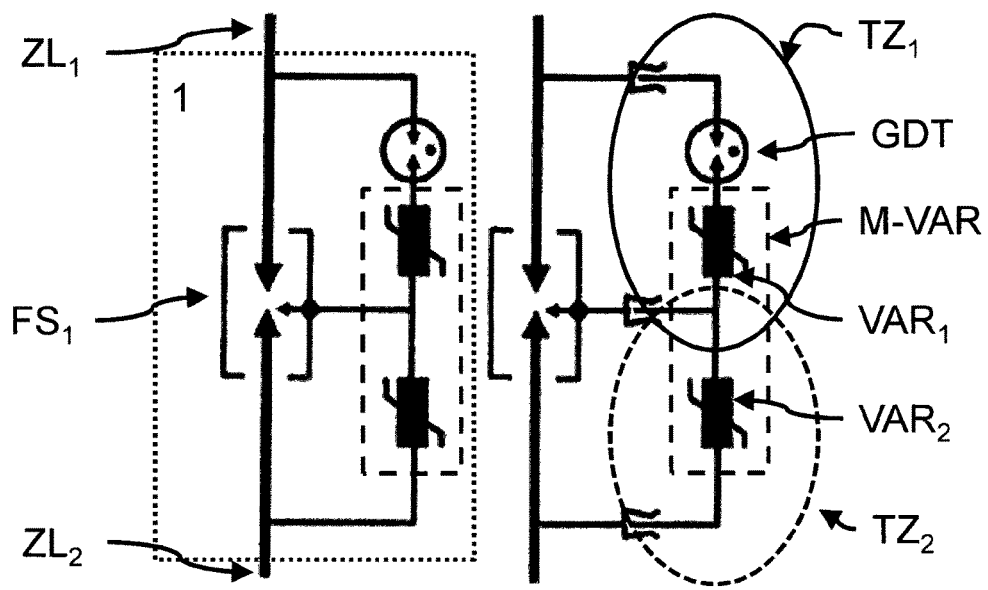
FIG. 4 shows spark gaps with an ignition circuit.
Figure 5:
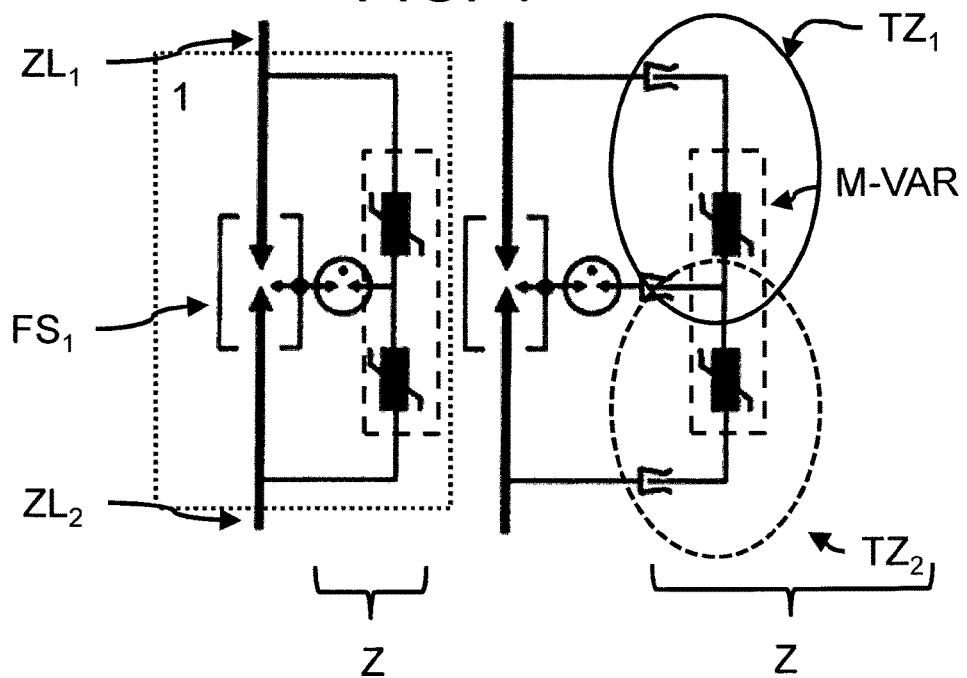
FIG. 5 shows spark gaps with an ignition circuit.

FIGS. 4 and 5 show other spark gaps with an ignition circuit. Unlike in FIG. 3, these also have a gas discharge tube (GDT). This kind of gas discharge tube GDT in the ignition circuit can enable the overall arrangement to continue to have a high insulation value. In the case of a pure varistor circuit $VAR_1$, $VAR_2$ of the ignition circuit Z (as shown in FIG. 1), this is not always provided. The arrangement according to FIG. 5 proves to be especially advantageous, since this arrangement enables an especially good adjustment of the respective ignition behavior. By varying the response voltage of the gas discharge tube GDT and through appropriate selection of the varistors, the voltage divider can be adjusted in relation to the current through the ignition circuit so that the spark gap is reliably ignited before overloading of the varistors. It is also expedient to use an asymmetrically arranged auxiliary electrode (as indicated in the figures).

To minimize the inductive influence by the ignition circuit, a multi-contact varistor M-VAR can advantageously be used. This kind of a multi-contact varistor M-VAR is shown schematically in FIG. 3. There, the multi-contact varistor M-VAR, which is illustrated by a dashed outline, has a first multi-contact varistor connector M-VARA$_1$ and a second multi-contact varistor connector M-VARA$_2$.

Moreover, the multi-contact varistor M-VAR has a tap A. Although only one tap is shown, several taps can also be provided. In terms of circuit technology, the multi-contact varistor M-VAR constitutes an integrated series connection consisting of a first varistor VAR$_1$ and a second varistor VAR$_2$. What is more, the use of multi-contact varistors M-VAR has the advantage that only one single temperature monitor can be provided for these components, whereas several temperature monitors must be provided for a discrete series connection in the great majority of cases. Moreover, by using a multiple varistor, it is always ensured that the subvaristors originate from a single manufacturing batch. Parasitic inductivities are also prevented by virtue of the integrated approach. This can have a positive influence on switching behavior. It should be noted here that the tap does not necessarily have to lead to a symmetrical division of voltage; rather, the subvaristors VAR$_1$ and VAR$_2$ can also be selected so as to be different. Furthermore, the use of components is minimized, since now only one multi-contact varistor M-VAR is used.

This concept can also be broadened to include series connections of spark gaps. Through a series connection of spark gaps, an overvoltage protection device 1 can be provided that can withstand lightning impulse current and restrict line follow current.

Figure 6:
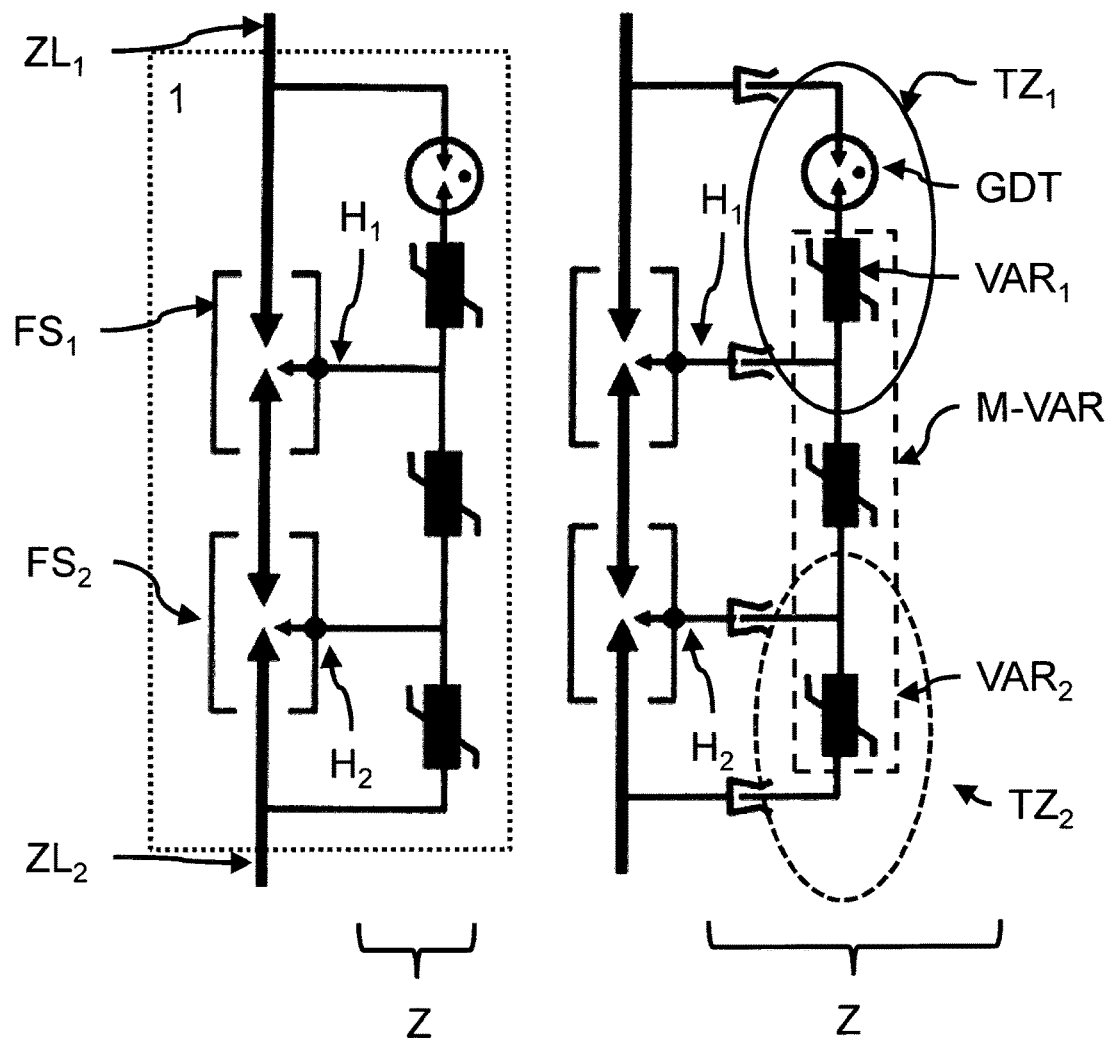
FIG. 6 shows series connections of spark gaps with an ignition circuit according to embodiments of the invention.
Figure 7:
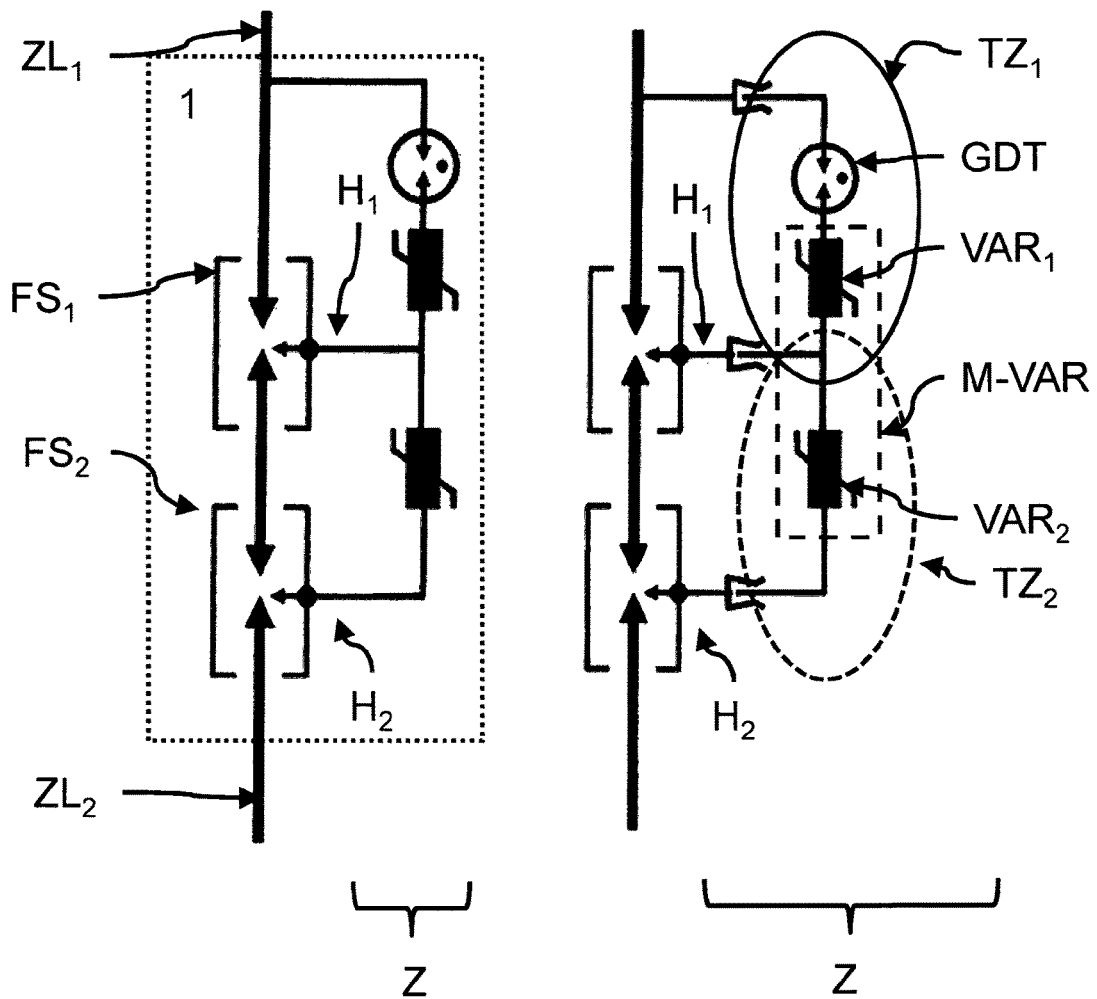
FIG. 7 shows series connections of spark gaps with an ignition circuit according to additional embodiments of the invention.
Figure 8:
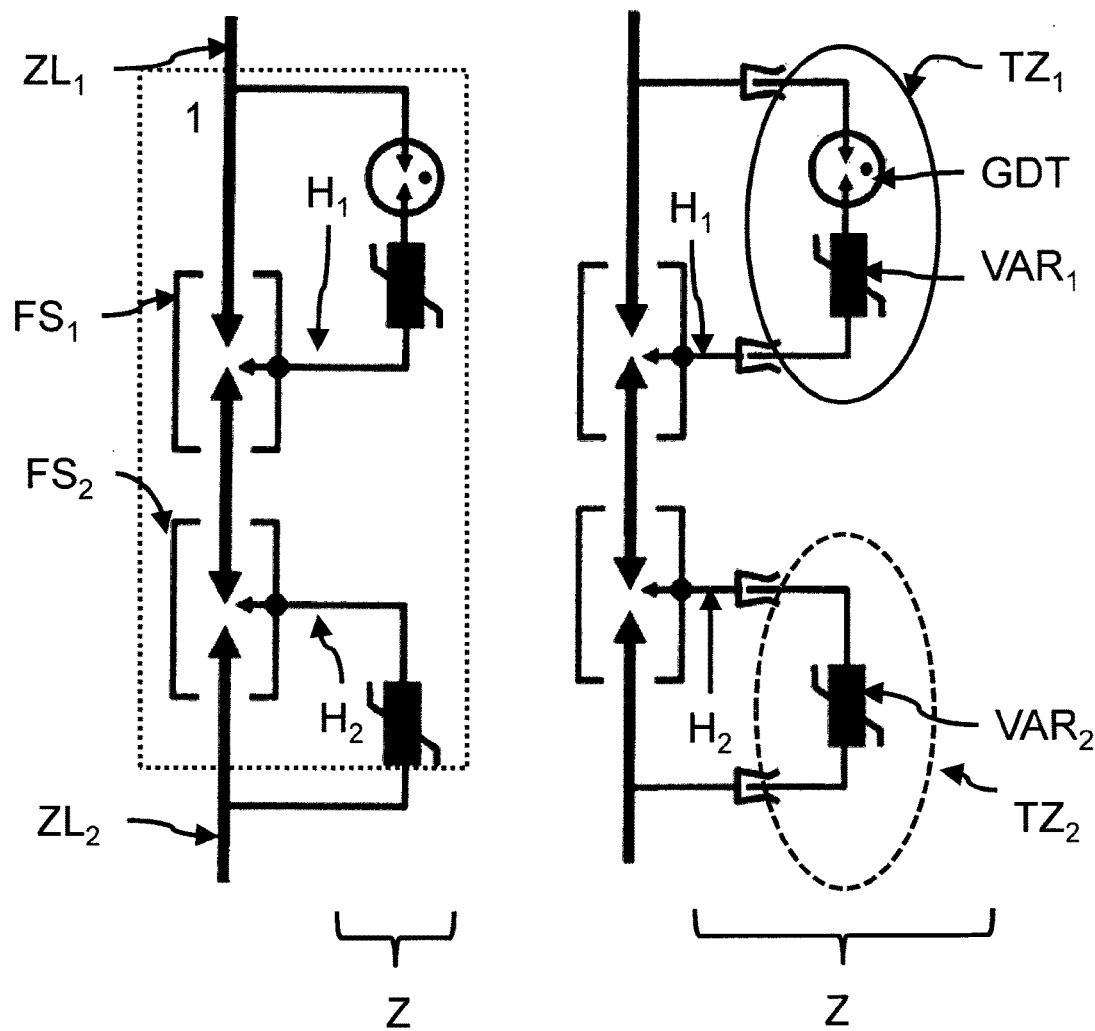
FIG. 8 shows series connections of spark gaps with an ignition circuit according to yet other embodiments of the invention.

FIGS. 6 to 8 show series connections of spark gaps with an ignition circuit according to embodiments of the invention.

In these figures, one ignition circuit Z is shown for a series connection of at least two spark gaps FS$_1$, FS$_2$ in order to limit overvoltages with medium and high power, particularly overvoltages corresponding to pulse shapes 8/20 μs and 10/350 μs with amplitudes from about 10 kA to about 200 kA (class I arrester). The spark gaps FS$_1$, FS$_2$ are each equipped with at least one auxiliary electrode H$_1$, H$_2$. The ignition circuit Z has a first varistor VAR$_1$ and a second varistor VAR$_2$. The ignition circuit Z is particularly suited to limiting overvoltages with medium power, particularly overvoltages corresponding to pulse shape 8/20 μs with amplitudes from about 10 to about 100 kA (class II arrester). The ignition circuit Z is designed to be connected to the auxiliary electrodes H$_1$, H$_2$, with the ignition circuit Z having two ignition subcircuits TZ$_1$, TZ$_2$, the first ignition subcircuit TZ$_1$ having the first varistor VAR$_1$ and being designed to ignite the first spark gap FS$_1$, and the second ignition subcircuit TZ$_2$ having the second varistor VAR$_2$ and being designed to ignite the second spark gap FS$_2$.

The optional gas discharge tube GDT shown in FIGS. 6 and 7 represents an insulation of the arrangement, particularly of the ignition circuit Z, since the two spark gaps (ignition electrodes for the two respective lower main electrodes) have no insulation with a resistive connection.

Via the three varistors of FIG. 6, another protective path with a low protection level is constructed which limits the voltage until the two spark gaps FS$_1$, FS$_2$ ignite. At the same time, the varistors act as ignition varistors for the spark gaps. It can be expedient to use varistors with different nominal voltages in order to optimize the ignition of the spark gaps with a low protection level in the overall arrangement.

The varistors of the ignition circuit can be provided with one or more thermal partitioning devices.

In the embodiment according to FIG. 7, unlike in FIG. 6, only one series connection of two varistors is used. That is, the ignition circuit can no longer simply be regarded as an independent protective path. The two auxiliary electrodes H$_1$, H$_2$ of the spark gaps FS$_1$, FS$_2$ are controlled via the two varistors VAR$_1$, VAR$_2$. One consequence of omitting the third varistor can be that the two spark gaps, particularly the lower spark gap, ignite earlier, since the entire initial current flows through the first spark gap. Since a quick ignition of the spark gaps is generally positive for the protection level, an improved protection level can be set through appropriate dimensioning of the varistors.

In the embodiments according to FIGS. 6 and 7, the first ignition subcircuit TZ$_1$ and the second ignition subcircuit TZ$_2$ of the ignition circuit Z constitute a series connection.

These embodiments are especially suitable for the use of multi-contact varistors M-VAR. The use of multi-contact varistors M-VAR in turn leads to the advantages already described above. That is, the first varistor VAR$_1$ and the second varistor VAR$_2$ are part of a multi-contact varistor M-VAR with at least one tap A. The tap A is then designed to be connected to the first auxiliary electrode H$_1$. In the embodiment of FIG. 6, a multi-contact varistor M-VAR with several taps can also be used. A first tap is then designed to be connected to the first auxiliary electrode H$_1$, whereas another tap is designed to be connected to the second auxiliary electrode H$_2$. However, as will readily be understood, a single multi-contact varistor M-VAR with a tap A can also be used in series with a discrete additional varistor.

In the embodiments according to FIGS. 6 and 8, the second ignition subcircuit TZ$_2$ is designed to be connected to a second lead ZL$_2$ of the series connection by at least two spark gaps FS$_1$, FS$_2$. This corresponds to the circuit concept of FIG. 4.

In other advantageous embodiments, the ignition circuit also has a gas discharge tube GDT, with the first ignition subcircuit TZ$_1$ having the gas discharge tube GDT and the first varistor VAR$_1$ as a series connection and being designed to ignite the first spark gap FS$_1$. As a result, the overall insulation of the arrangement can be kept high.

The ignition circuit Z sketched out above can readily be integrated (as shown on the left side of FIGS. 6 to 8) or connected (as shown on the rights sides of FIGS. 6 to 8). In the integrated construction, an overvoltage protection device 1 can be provided that has the characteristics of withstanding lightning impulse current and restricting line follow current. On the other hand, the pluggable variant can be used for retrofittable protection with improved ignition behavior. It is thus readily possible to offer a cost-effective combination product that can be adapted to needs in the simplest of manners.

In the embodiment that is shown in FIG. 8, the two ignition subcircuits are embodied separately from each other. The first ignition subcircuit TZ$_1$ is designed to be connected to a first lead ZL$_1$ of the series connection by at least two spark gaps FS$_1$, FS$_2$. Analogously, the second ignition subcircuit TZ$_2$ is designed to be connected to a second lead ZL$_2$ of the series connection by at least two spark gaps FS$_1$, FS$_2$. Finally, it should also be noted in relation to FIG. 8 that the arrangement of the auxiliary electrodes can be set up in relation to the leads with an asymmetrical arrangement or resistive coupling such that the electrodes at the shortest distance from the auxiliary electrodes are electrically contacted. This is especially advantageous if the auxiliary electrodes are connected resistively to one of the main electrodes of the respective spark gap. Through this arrangement, the respective electrodes that are not connected resistively are arranged on the outer sides of the lead, thus providing improved insulation.

When reference is made above to class I and class II arresters, this merely refers to characteristics of the corresponding arresters. Actual compatibility with standards is irrelevant.

Furthermore, the varistors can also be embodied as multi-contact varistors. Such multi-contact varistors are the subject matter of German patent application DE 10 2012 011 241, for example, to which explicit reference is made here. In this embodiment of the varistors, the varistor has a parallel connection of subvaristors in which many individual contacts next to each other contact a common varistor ceramic in parallel. For instance, one lead side of a varistor and/or a lead A can be embodied as a multiple contact in relation to one or both subvaristors adjacent thereto.

These multiple-contact varistors enable an additional reduction of the protection level while simultaneously increasing the protection against short-circuiting. Such a design can also be combined with a series connection as described above, so that a multiple multi-contact varistor is used.

LIST OF REFERENCE SYMBOLS tap A
spark gaps $FS_1$, $FS_2$
spark gap connector $FSA_1$, $FSA_2$
gas discharge tube GDT
auxiliary electrode $H_1$, $H_2$
ignition subcircuits $TZ_1$, $TZ_2$
varistor $VAR_1$, $VAR_2$
ignition circuit Z
lead $ZL_1$, $ZL_2$
multi-contact varistor M-VAR
multi-contact varistor connector $M\text{-}VARA_1$, $M\text{-}VARA_2$
overvoltage protection device 1

The invention claimed is:

1. An ignition circuit comprising a series connection of at least first and second spark gaps, the first and second spark gaps suitable for limiting overvoltages corresponding to pulse shapes 8/20 μs and 10/350 μs with amplitudes between about 10 kA to about 200 kA, with the at least first and second spark gaps each being equipped with at least one auxiliary electrode and the ignition circuit having a first varistor and a second varistor, wherein the first and second varistors are suited to limiting overvoltages corresponding to pulse shape 8/20 μs with amplitudes between about 10 kA to about 100 kA, with the ignition circuit being designed to be connected to the at least one auxiliary electrode, with the ignition circuit having first and second ignition subcircuits, with the first ignition subcircuit having the first varistor and being designed to ignite the first spark gap, and with the second ignition subcircuit having the second varistor and being designed to ignite the second spark gap, wherein the first ignition subcircuit is designed to be connected to a first lead of the series connection of the at least first and second spark gaps.

2. The ignition circuit as set forth in claim 1, wherein the first ignition subcircuit and the second ignition subcircuit constitute a series connection.

3. The ignition circuit as set forth in claim 1, wherein the first varistor and the second varistor are part of a multi-contact varistor with at least one tap, with the tap being designed to be connected to a first of the at least one auxiliary electrode.

4. The ignition circuit as set forth in claim 1, wherein the second ignition subcircuit is designed to be connected to a second lead of the series connection of the at least first and second spark gaps.

5. The ignition circuit as set forth in claim 1, further comprising a gas discharge tube, with the first ignition subcircuit having the gas discharge tube and the first varistor as a series connection and being designed to ignite the first spark gap.

6. The ignition circuit as set forth in claim 1, wherein one or more of the first varistor and the second varistor is a multi-contact varistor.

7. An overvoltage protection device with an ignition circuit comprising a series connection of at least first and second spark gaps, the first and second spark gaps suitable for limiting overvoltages corresponding to pulse shapes 8/20 μs and 10/350 μs with amplitudes between about 10 kA to about 200 kA, with the at least first and second spark gaps each being equipped with at least one auxiliary electrode and the ignition circuit having a first varistor and a second varistor, wherein the first and second varistors are suited to limiting overvoltages corresponding to pulse shape 8/20 μs with amplitudes between about 10 kA to about 100 kA, with the ignition circuit being designed to be connected to the at least one auxiliary electrode, with the ignition circuit having first and second ignition subcircuits, with the first ignition subcircuit having the first varistor and being designed to ignite the first spark gap, and with the second ignition subcircuit having the second varistor and being designed to ignite the second spark gap, wherein the first ignition subcircuit is designed to be connected to a first lead of the series connection of the at least first and second spark gaps.

8. The overvoltage protection device of claim 7, wherein the first and second spark gaps are connected to each other in series such that electrodes at the shortest distance from the at least one auxiliary electrode are electrically contacted.

9. Use of a multi-contact varistor for triggering a spark gap of class I, wherein the multi-contact varistor is suited to limiting overvoltages corresponding to pulse shape 8/20 μs with amplitudes from about 10 to about 100 kA, wherein the multi-contact varistor comprises at least one tap of an internal series connection of varistors of the multi-contact varistor, and wherein the at least one tap is used to trigger the spark gap.

10. The use of the multi-contact varistor of claim 9, wherein the multi-contact varistor contains at least one multiple-contact varistor.

* * * * *